US012615141B2

(12) United States Patent
Endo et al.

(10) Patent No.: US 12,615,141 B2
(45) Date of Patent: Apr. 28, 2026

(54) CRYPTOGRAPHIC KEY SHARING SYSTEM

(71) Applicant: National Institute of Information and Communications Technology, Tokyo (JP)

(72) Inventors: Hiroyuki Endo, Tokyo (JP); Masahide Sasaki, Tokyo (JP); Mikio Fujiwara, Tokyo (JP); Masahiro Takeoka, Tokyo (JP); Masato Koashi, Tokyo (JP); Toshihiko Sasaki, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 0 days.

(21) Appl. No.: 18/722,813

(22) PCT Filed: Dec. 21, 2022

(86) PCT No.: PCT/JP2022/047040
§ 371 (c)(1),
(2) Date: Jun. 21, 2024

(87) PCT Pub. No.: WO2023/120563
PCT Pub. Date: Jun. 29, 2023

(65) Prior Publication Data
US 2025/0055677 A1    Feb. 13, 2025

(30) Foreign Application Priority Data
Dec. 23, 2021    (JP) ................................ 2021-209085

(51) Int. Cl.
*H04L 9/08* (2006.01)
(52) U.S. Cl.
CPC ............ *H04L 9/0858* (2013.01); *H04L 9/085* (2013.01)

(58) Field of Classification Search
CPC ......... H04L 9/08; H04L 9/085; H04L 9/0852; H04L 9/0858; H04L 9/12; H04B 10/112; H04B 10/70
See application file for complete search history.

(56) References Cited

U.S. PATENT DOCUMENTS 8,170,211 B2 * 5/2012 Langer .................. H04L 9/0858
380/278
2005/0152540 A1 * 7/2005 Barbosa ................ H04L 9/0858
380/28

(Continued)

FOREIGN PATENT DOCUMENTS

CN       108365953 A  *  8/2018  ........... H04L 9/0869
WO   WO-2015166719 A1 * 11/2015  ............... H04K 1/00

OTHER PUBLICATIONS

U. S. Chahar and K. Chatterjee, "A novel Differential Phase Shift Quantum Key Distribution scheme for secure communication," 2015 International Conference on Computing and Communications Technologies (ICCCT), Chennai, India, 2015, pp. 156-159. (Year: 2015).*

(Continued)

*Primary Examiner* — Michael Simitoski
(74) *Attorney, Agent, or Firm* — GRUMBLES LAW PLLC; Brittany Haanan

(57) ABSTRACT

A sender system is equipped with an optical transmitter that transmits an encoded optical signal at a predetermined strength via an LOS communication channel, and a key distillator that generates a cryptographic key from a random bit sequence of the optical transmitter by a key distillation processing via the authenticated public communication channel. A legitimate receiver is equipped with an optical receiver that receives the optical signal from the optical transmitter via the LOS communication channel, and a key distillator that generates a cryptographic key from the ran- (Continued)

dom bit sequence from the optical receiver through a key distillation processing via the authenticated public communication channel.

5 Claims, 9 Drawing Sheets

(56)                    References Cited

U.S. PATENT DOCUMENTS

| 2006/0013396 A1* | 1/2006 | Kollmitzer | H04L 9/0855 |
| | | | 380/256 |
| 2010/0034390 A1* | 2/2010 | Yamamoto | H04L 9/0858 |
| | | | 380/278 |
| 2013/0016835 A1* | 1/2013 | Zbinden | H04B 10/70 |
| | | | 380/255 |
| 2015/0134947 A1* | 5/2015 | Varcoe | H04L 9/0852 |
| | | | 713/150 |
| 2016/0234018 A1 | 8/2016 | Frohlich et al. | |
| 2019/0149327 A1* | 5/2019 | Yuan | H04L 9/0852 |
| | | | 380/255 |
| 2019/0379463 A1 | 12/2019 | Shields et al. | |
| 2020/0092089 A1* | 3/2020 | Takahashi | H04L 9/0852 |
| 2020/0274701 A1 | 8/2020 | Yuan et al. | |
| 2021/0006337 A1 | 1/2021 | Ling et al. | |
| 2021/0385079 A1* | 12/2021 | Curty Alonso | H04L 9/085 |
| 2022/0123928 A1* | 4/2022 | Durak | H04L 9/0855 |
| 2023/0035266 A1* | 2/2023 | Banerjee | H04L 9/0819 |
| 2025/0023720 A1* | 1/2025 | Lim | H04L 9/0861 |
| 2025/0240155 A1* | 7/2025 | Kumar | H04L 9/0858 |
| 2025/0254033 A1* | 8/2025 | Lange | H04L 9/0852 |

OTHER PUBLICATIONS

Hatakeyama, Yuki, et al. "Differential-phase-shift quantum-key-distribution protocol with a small number of random delays." Physical review a 95.4 (2017): 042301. (Year: 2017).*
Inoue, Kyo, Edo Waks, and Yoshihisa Yamamoto. "Differential phase shift quantum key distribution." Physical review letters 89.3 (2002): 037902. (Year: 2002).*
Honjo, Toshimori, et al. "Countermeasure against tailored bright illumination attack for DPS-QKD." Optics express 21.3 (2013): 2667-2673. (Year: 2013).*
Sasaki Masahide et al. WO 2015166719 A1 (machine translation), published Nov. 5, 2015. (Year: 2015).*
Xu, Feihu, et al. "Secure quantum key distribution with realistic devices." Reviews of modern physics 92.2 (2020): 025002. (Year: 2020).*
Guo, Ying et al. CN 108365953 A (machine translation), published Aug. 3, 2018. (Year: 2018).*
Honjo et al., "Toward a backbone network QKD", Toward Intercity QKD, NTT Basic Research Laboratories NiCT20.
International Search Report and Written Opinion pertaining to PCT/JP2022/047040, mailed Feb. 14, 2023.
Pan et al., "Secret Key Distillation Across a Quantum Wiretap Channel Under Restricted Eavesdropping", Apr. 18, 2019, pp. 1-15.

* cited by examiner

Figure 4:
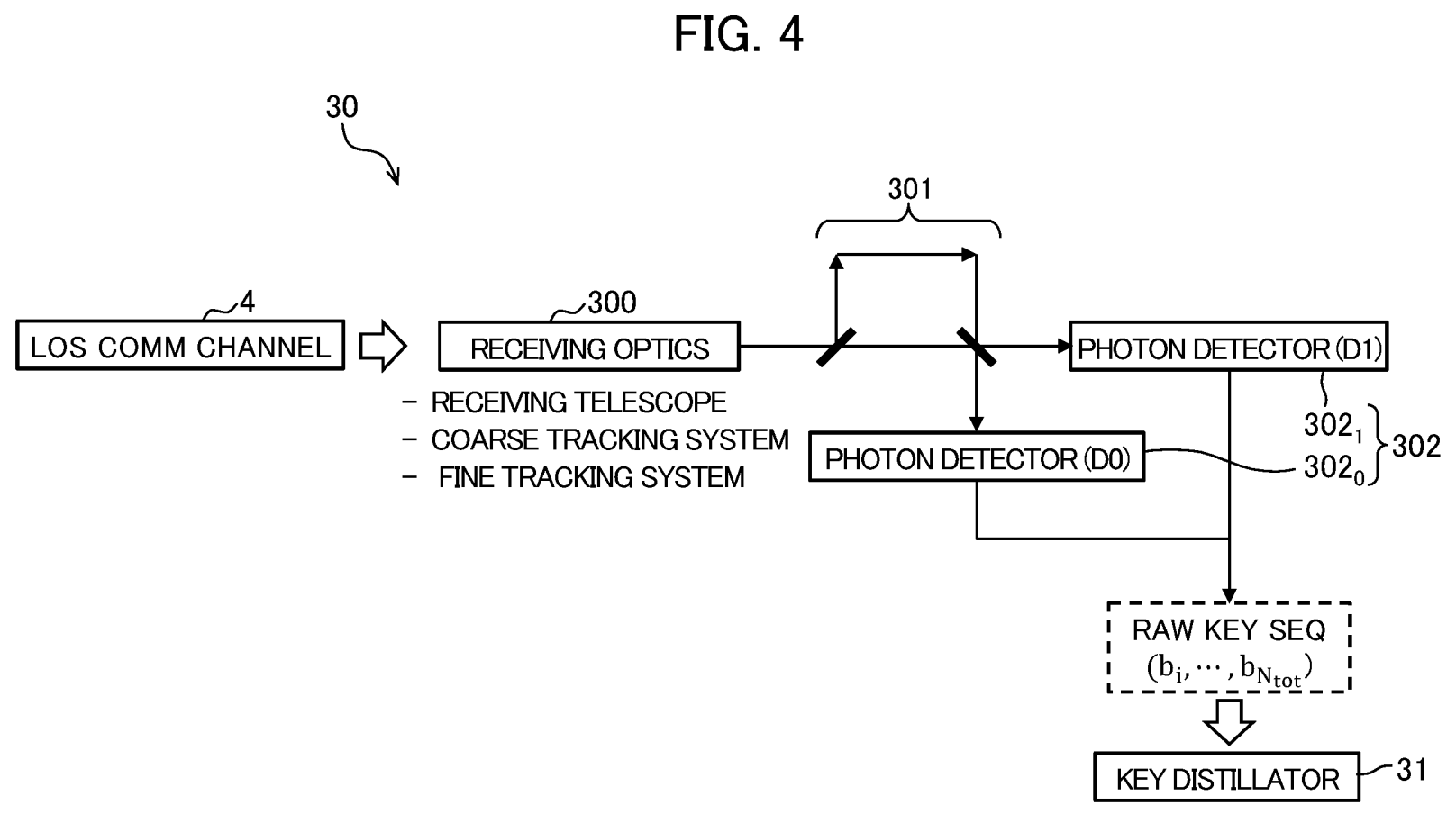

LOS COMM CHANNEL — 4

30

RECEIVING OPTICS — 300
- RECEIVING TELESCOPE
- COARSE TRACKING SYSTEM
- FINE TRACKING SYSTEM

301

PHOTON DETECTOR (D1) — $302_1$

PHOTON DETECTOR (D0) — $302_0$

302

RAW KEY SEQ $(b_i, \cdots, b_{N_{tot}})$

KEY DISTILLATOR — 31

FIG. 6

CRYPTOGRAPHIC KEY SHARING SYSTEM

TECHNICAL FIELD

The present invention relates to a cryptographic key sharing system that utilizes an optical signal propagating through a LOS (Line-Of-Sight) communication channel in a free space to share information-theoretically secure cryptographic key.

BACKGROUND ART

A conventional communication infrastructure employs the public-key cryptography system to share a cryptographic key for keeping communications secret. However, security of the public-key cryptography system is guaranteed under assumption of limitation of a cryptanalyst's computational ability, and in principle the cryptographic key could be deciphered by a computational process if one is willing to take time and effort.

On the other hand, the physical layer cryptography using a LOS communication channel and the quantum key distribution (QKD) are being studied as information-theoretically secure cryptographic key sharing technique. "Information-theoretically secure" technique means that this technique has been mathematically proven on the basis of information theory that an eavesdropper cannot decrypt a text encrypted with this technique even if the eavesdropper is assumed to have unlimited computing power.

The physical layer cryptography shares information-theoretically secure cryptographic keys by using the light propagating through the LOS communication channel in the free space (see PTL 1 and NPL 1). Compared to the quantum key distribution, this physical layer cryptography has advantages of a faster cryptographic key generation speed and an ability to deliver a cryptographic key over a long distance. On the other hand, the quantum key distribution has an advantage, compared to the physical layer cryptography, that information-theoretically secure cryptographic keys are able to be shared against various physically feasible attacks as well as eavesdropping.

CITATION LIST

Patent Literature

PTL 1: International Application Publication No. WO/2019/139544

Non-Patent Literature

NPL 1: Z. Pan et al, "Secret-key distillation across a quantum wiretap channel under restricted eavesdropping," Phys. Rev. Applied, vol. 14, no. 2, 024044, 2020.

SUMMARY OF INVENTION

Technical Problem

In the conventional physical layer cryptography, because the eavesdropper needs to specify a communication channel model, the eavesdropping model is limited to a range in which the communication channel model can be specified. Therefore, the physical layer cryptography may not be able to share information-theoretically secure cryptographic keys in the future when quantum technology is further developed so that the eavesdropper's capability improves.

The conventional quantum key distribution has its key generation speed and transmission distance severely limited in exchange for its strong security. In order to expand the information-theoretically secure information communication network to a global scale, it is necessary to achieve a high-speed cryptographic key generation between low-Earth-orbit satellites and ground stations, and key sharing between high-altitude geostationary orbit satellites and ground stations. However, it is difficult for the quantum key distribution to meet the above requirements due to the limitations in the key generation speed and transmission distance.

Therefore, the present invention is to provide a cryptographic key sharing system that can share an information-theoretically secure cryptographic key and as well as improve the key generation speed and transmission distance.

Solution to Problem

To solve the above problem, the present invention provides a cryptographic key sharing system that shares a cryptographic key between a differential phase shift keying quantum key transmitter and a differential phase shift keying quantum key receiver using an optical signal propagating through a line-of-sight (LOS) communication channel, wherein the differential phase shift keying quantum key transmitter is equipped with an optical transmitter that encodes random bits into the optical signal using differential phase shift keying and transmits the encoded optical signal at a predetermined strength via the LOS communication channel, and a first key distillator that generates a cryptographic key from a sequence of the random bits from the optical transmitter using key distillation processing via an authenticated public communication channel; and the differential phase shift keying quantum key receiver is equipped with an optical receiver that receives the optical signal from the optical transmitter via the LOS communication channel and decodes the received optical signal into the random bits, and a second key distillator that generates a cryptographic key from a sequence of the random bits from the optical receiver using the key distillation processing via the authenticated public communication channel.

According to the above configuration, because the cryptographic key sharing system can apply the differential phase shift keying quantum key distribution to the LOS communication channel and set a strength of the optical signal to an appropriate value, the cryptographic key sharing system is able to improve the key generation speed and transmission distance. Furthermore, the cryptographic key sharing system can generate a cryptographic key that satisfies universal composability without any restrictions on eavesdropping within an assumed range of the LOS communication channel, so that information-theoretically secure cryptographic keys can be shared even when the eavesdroppers' capabilities have been improved.

Universal composability is a property that security guaranteed for each protocol as a stand-alone entity holds in any composition of protocols and in any environment in which they are used. In general, security of quantum key distribution is measured by a trace distance between quantum states representing an ideal protocol and a protocol actually implemented, and it is said that a protocol is $\varepsilon$-secure if the trace distance is able to be made smaller than an arbitrarily specified small value of $\varepsilon$. For example, if the universal composability is satisfied, then composing an $\varepsilon$-secure protocol with an $\varepsilon'$-secure protocol results in a $(\varepsilon+\varepsilon')$-secure protocol. The universal composability of the cryptographic key sharing systems is described below.

Advantageous Effects of Invention

The invention allows improving a key generation speed and a transmission distance, as well as sharing of information-theoretically secure cryptographic keys.

BRIEF DESCRIPTION OF DRAWINGS

FIG. 1 is an illustration explaining a communication channel model in an embodiment.

FIG. 2 is a block diagram showing a structure of a cryptographic key sharing system.

FIG. 4 is a block diagram showing a configuration of an optical receiver in the embodiment.

FIG. 6 is an illustration explaining an adjustment of a compression ratio of a cryptographic key in the embodiment.

DESCRIPTION OF EMBODIMENTS

Figure 3:
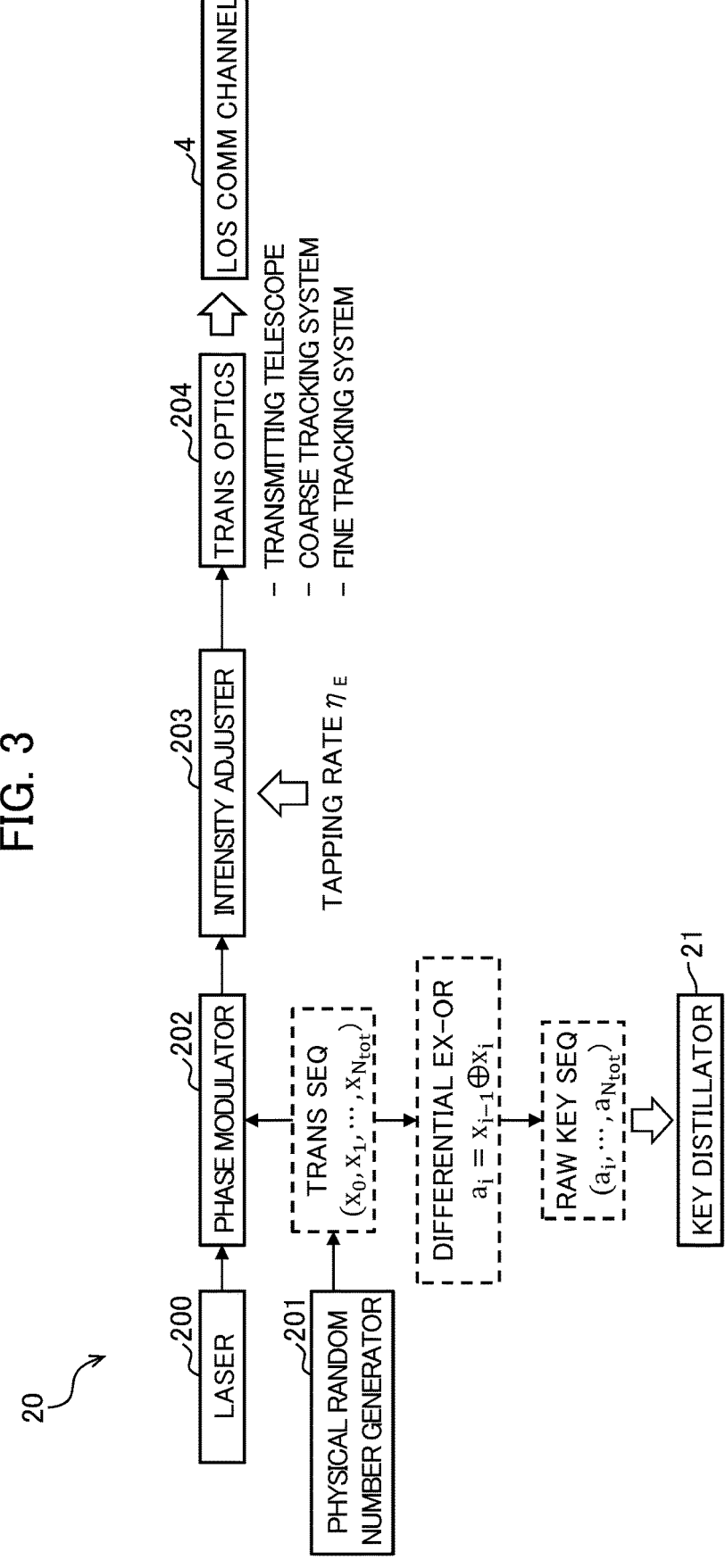
FIG. 3 is a block diagram showing a structure of an optical transmitter in the embodiment.

The embodiments are described below with reference to the drawings. However, the embodiments described below are intended to embody the technical concept of the invention and do not limit the invention to the following embodiments unless specifically described. In addition, the same components may be marked with the same reference signs and their description may be omitted.

<Communication Channel Model>

Figure 1:
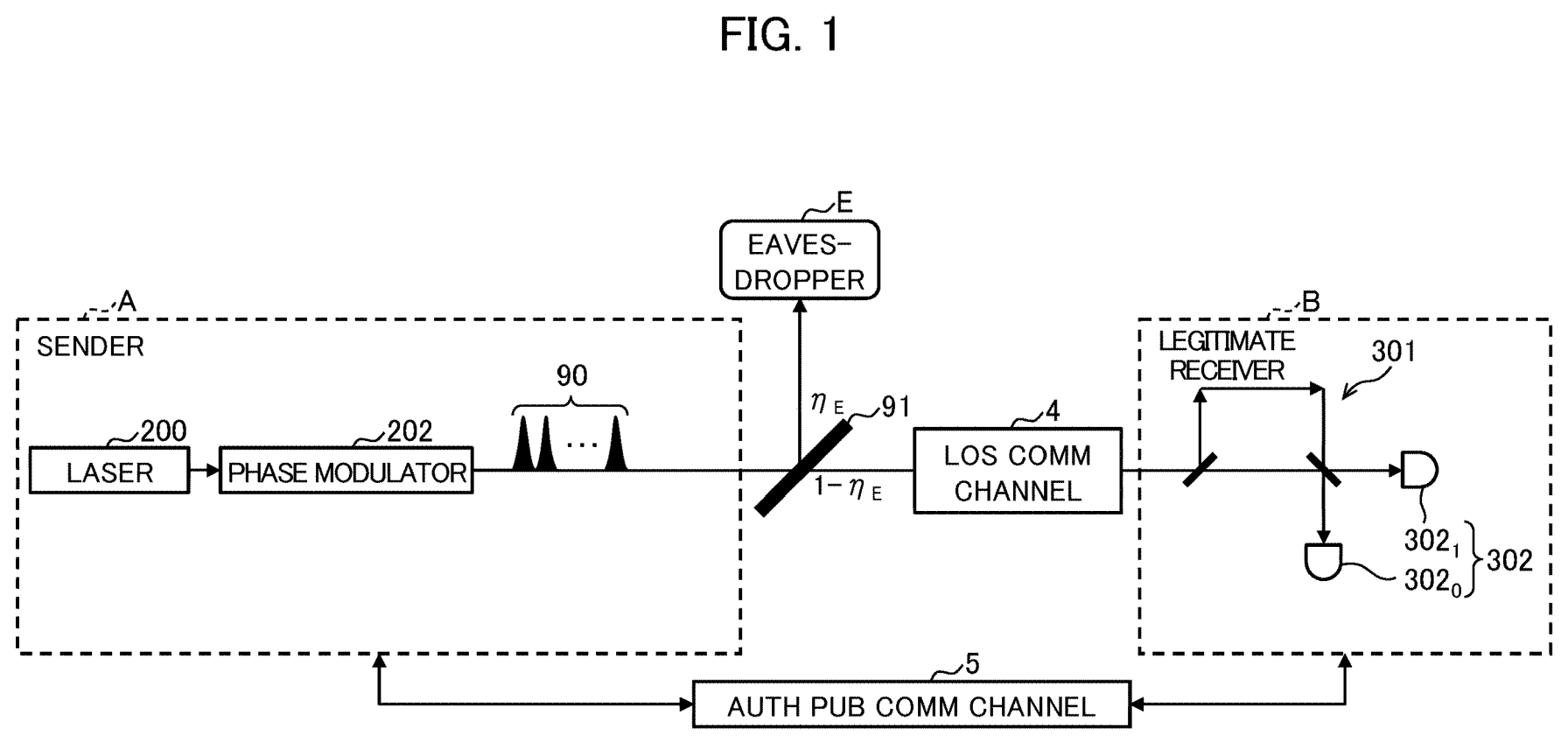

Referring to FIG. 1, description is given of a communication channel model that is a premise of a cryptographic key sharing system 1 (FIG. 2) according to the embodiment.

The cryptographic key sharing system 1 (FIG. 2) that employs the LOS quantum key distribution is proposed as a physical layer cryptographic technique that is applicable to an LOS communication channel 4 in which atmospheric fluctuations exist (for example, a channel between a low-Earth-orbit satellite and a ground station, or between a high-altitude geostationary orbit satellite and a ground station). The LOS quantum key distribution is one of proof techniques of security of the quantum key distribution for the communication channel model shown in FIG. 1, and is able to prove the security by applying a complementarity approach, which is able to prove the security independently of a property of the LOS communication channel 4 between a sender A and a legitimate receiver B.

As shown in FIG. 1, the sender A has a laser source 200 and a phase modulator 202 to encode random bits. Wherein the modulation scheme is a differential phase shift keying scheme that determines a bit value depending on relative phases of a preceding and succeeding optical pulses. In addition, an average number of photons of optical pulses is denoted by $\mu_A$. Note that description is given below of how to determine the average number of photons $\mu_A$.

The sender A transmits a modulated optical pulse train 90 to the legitimate receiver B through the communication channel 4 that has phase insensitivity, which is the only condition required for the LOS communication channel 4 and called so because the LOS communication channel 4 must be independent on an absolute phase of each optical pulse or the relative phases between the optical pulses, although any physical phenomenon, not limited to the atmospheric fluctuations may be assumed to influence the optical pulse train 90 passing through the LOS communication channel 4. For this phase insensitivity condition to be violated, the LOS communication channel 4 needs to be provided with a means such that makes a dipole moment of atmospheric particles resonate with the phase of the optical pulse, which further influences the subsequent photons, or some other means, which requires that a relaxation time of the dipole moment must be longer than an interval between optical pulses, or that a line width of a resonant frequency of the dipole moment must correspond to the interval. At a modulation rate of the current differential phase shift keying (about 1 GHz), it is unlikely that the atmospheric molecule has such a sharp line width. Therefore, the differential phase shift keying could be thought to satisfy this phase insensitivity.

As shown in FIG. 1, the legitimate receiver B is provided with a 1-bit delay interferometer 301 and two photon detectors 302 (302-0, 302-1) placed at an output of the 1-bit delay interferometer 301. The legitimate receiver B demodulates the optical pulses sent from the sender A.

The photon detector 302 is an on-off photon detector that turns on when it senses a presence of a photon regardless of the number of photons. The legitimate receiver B assigns a number "0" to the first photon detector 302-0 and "1" to the second photon detector 302-1, and records numbers of photon detectors 302-0, 302-1 that have been turned on at a certain time. A bit sequence in which this bit information is aligned in chronological order is called a raw key of the legitimate receiver B. The on-off photon detector 302 has a property of dark counting, which outputs an electrical pulse even though no photons have arrived. There is also a possibility of photons leaking into a wrong output port due to imperfections in the delayed interferometer. If two photon detectors 302-0 and 302-1 are simultaneously turned on due to the above effects, such a case would be treated as a successful detection and either "0" or "1" would be assigned.

An eavesdropping method of the eavesdropper E is, similarly to the physical layer cryptography, restricted to passive eavesdropping scenarios performed from various non-line-of-sight locations (for example, an edge of beam footprint, behind the legitimate receiver B) to avoid being detected by the sender A or the legitimate receiver B. In the LOS quantum key distribution, these eavesdropping scenarios come down to a model in which the eavesdropper E eavesdrops through a beam splitter 91 that is placed at a front stage of the sender A. In this eavesdropping model, it is assumed that the eavesdropper E can steal a light pulse intensity corresponding to a reflectance (tapping rate) ne of the beam splitter 91 among intensities of light pulses transmitted by the sender A. In other words, the tapping ratio ne represents a ratio at which the eavesdropper E is able to tap the optical signal 40 in the LOS communication channel 4. On the other hand, it is assumed that the eavesdropper E is able to eavesdrop with a receiver implementing any demodulation method like the quantum cryptography, and is able to apply any signal processing to the eavesdropped information. The determining method of the tapping ratio ne is described below.

The bit sequences, or raw keys, of the sender A and the legitimate receiver B are different from each other and may have been partially leaked to the eavesdropper E. To generate from the raw keys a secure bit sequence, or a final key that is equal to each other between the sender A and the legitimate receiver B, a signaling process called a key distillation processing is performed while exchanging information through an authenticated public communication channel 5.

The security of this LOS quantum key distribution can be calculated by the trace distance $d_{Tr}(\rho, \sigma)$ between two quantum states $\rho$ and $\sigma$, as shown in the following equation (1), like the general quantum key distribution. Note that Tr denotes the trace operator.

[Math. 1]

$$d_{Tr}(p, \sigma) = \frac{1}{2} Tr\left[\sqrt{(\rho - \sigma)^{\dagger}(p + \sigma)}\right] \quad (1)$$

Note that † denotes Hermite conjugate.

The simultaneous quantum state spanning the state of a final key $|\kappa^{fin}_A\rangle\langle\kappa^{fin}_A|$ of the sender A at the end of the key distillation processing and the quantum state $92_E(\kappa^{fin}_A)$ held in the quantum memory by the eavesdropper E is expressed by the following equation (2). where the bit sequence of the final key of the sender A is denoted by $\kappa^{fin}_A$.

[Math. 2]

$$\rho^{fin}_{AE} := \sum_{\kappa^{fin}_A} Pr(\kappa^{fin}_A)|\kappa^{fin}_A\rangle\langle\kappa^{fin}_A| \otimes \rho_E(\kappa^{fin}_A) \quad (2)$$

Note that ⊗ denotes Hermite conjugate.

The quantum state corresponding to the ideal key is expressed by the following equation (3). Note that $|\cdot|$ denotes a length of the sequence, $Tr_A(\cdot)$ denotes a partial trace focusing on the sequence of the sender A. The trace distance between these two quantum states is defined by the following equation (4).

[Math. 3]

$$\rho^{ideal}_{AE} := \sum_{\kappa^{fin}_A} \frac{1}{2|\kappa^{fin}_A|}|\kappa^{fin}_A\rangle\langle\kappa^{fin}_A| \otimes Tr_A(\rho^{fin}_A) \quad (3)$$

[Math. 4]

$$d_{Tr}(\rho^{fin}_{AE}, \rho^{ideal}_{AE}) \quad (4)$$

The value defined by the equation (4) is called the quantum universal security criterion. In the LOS quantum key distribution, because the security can be evaluated with this quantum universal security criterion, the security can be evaluated even when the eavesdropper E can perform general eavesdropping using the quantum mechanics. Furthermore, because the quantum universal security criterion is a security criterion that satisfies so-called universal composability, security evaluation compatible with other security technologies that satisfy universal composability is also possible. If the result of the calculation of the equation (4) is smaller than the predefined value $\varepsilon_x$, then this LOS quantum key distribution protocol is called Ex-secure.

Because the LOS communication employs a high directivity laser beam, it is practically extremely difficult for the eavesdropper E to conduct an active attack such as placing an eavesdropping device in a center of an optical beam, and eavesdropping, applying some processing on, and retransmitting all optical signals without being detected by the sender A or the legitimate receiver B. Therefore, the eavesdropper E has no choice but to utilize light leaking from the LOS communication channel 4 (leakage light) due to atmospheric fluctuations, etc., to avoid being seen by the sender A and the legitimate receiver B. However, it is obvious that disturbances in the natural environment including atmospheric fluctuations cannot be secretly and intentionally controlled by the eavesdropper E. For these reasons, it is thought to be reasonable to assume a communication channel model in which the eavesdropper E can tap information only from the leaking optical signals in the LOS communication using laser beams. Further, the states of the LOS communication channel 4 and its surroundings can be directly observed by various means to determine validity of the eavesdropping model.

Assuming the LOS communication channel 4 as described above, the leakage light leaking outside the LOS communication channel 4 can be represented by the tapping rate NE, and easily modeled using the beam splitter 91. In this case, an act of eavesdropping by the eavesdropper E is limited to performing some operation including measurement of the leaked light. Under this assumption, in a case in which the differential phase shift keying scheme is employed as the quantum key distribution scheme, a cryptographic key having the universal composability can be generated.

[Configuration of Cryptographic Key Sharing System]

Figure 2:
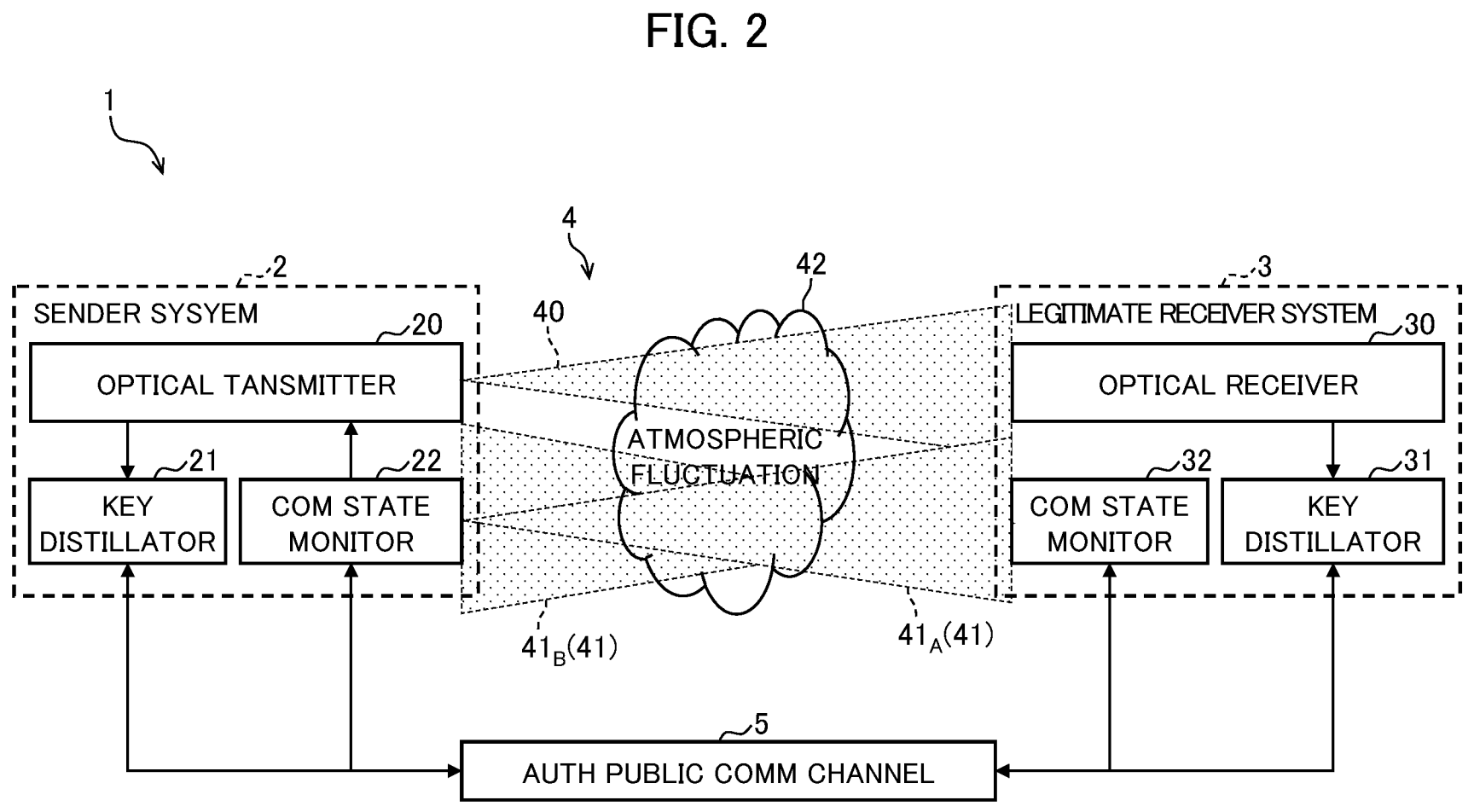

Referring to FIG. 2, description is given of a configuration of the cryptographic key sharing system 1 according to the embodiment.

The cryptographic key sharing system 1 shares cryptographic keys between a sender system (differential phase shift keying quantum key transmitter) 2 and a legitimate receiver system (differential phase shift keying quantum key receiver) 3 using an optical signal 40 propagating through the LOS communication channel 4. As shown in FIG. 2, the cryptographic key sharing system 1 includes the sender system 2, the legitimate receiver system 3, the LOS communication channel 4, and an authenticated public communication channel 5. FIG. 2 illustrates an atmospheric fluctuation 42 of the optical signal 40, the probe light 41, and the LOS communication channel 4.

The sender system 2 transmits an optical signal 40 to the legitimate receiver system 3 via the LOS communication channel 4, and is equipped with an optical transmitter 20, a key distillator (first key distillator) 21, and a communication channel state monitor (first communication channel state monitor) 22.

The optical transmitter 20 encodes random bits into optical signals 40 by the differential phase shift keying, and transmits the encoded optical signals 40 at a predetermined intensity through the LOS communication channel 4.

The key distillator 21 generates a cryptographic key from the random bit sequence sent by the optical transmitter 20 via the authenticated public communication channel 5 using the key distillation processing.

The communication channel state monitor 22 measures a state of the LOS communication channel 4 (atmospheric fluctuation 42). Here, the communication channel state monitor 22 measures the state of the LOS communication channel 4 by observing a laser beam (probe light $41_B$) having sufficient intensity irradiated by a communication channel state monitor 32 which is described below. The communication channel state monitor 22 also irradiates a probe light $41_A$ to the communication channel state monitor 32.

The legitimate receiver system 3 receives the optical signals 40 from the sender system 2 via the LOS communication channel 4, and is equipped with an optical receiver 30, a key distillator (second key distillator) 31, and a communication channel state monitor (second communication channel state monitor) 32.

The optical receiver 30 receives optical signals 40 from the optical transmitter 20 via the LOS communication channel 4 and decodes the received optical signal 40 to random bits.

The key distillator 31 generates a cryptographic key from random bit sequence decoded by the optical receiver 30 through the key distillation via the authenticated public communication channel 5.

The communication channel state monitor 32 measures the state of the LOS communication channel 4 (atmospheric fluctuation 42). Here, the communication channel state monitor 32 measures the state of the LOS communication channel 4 by observing the laser beam (probe light $41_A$) having sufficient intensity irradiated by the communication channel state monitor 22. The communication channel state monitor 32 also irradiates the probe light $41_B$ to the communication channel state monitor 22.

The LOS communication channel 4 is a communication channel for LOS communication. The LOS communication refers to communication in which there is no obstruction between the sender and receiver and both parties can see through each other. For example, the LOS communication includes an optical communication between a low-Earth-orbit satellite and a ground station, and an optical communication between a high-altitude geostationary orbit satellite and a ground station.

The authenticated public communication channel 5 is an authenticated public communication channel. For example, the authenticated public communication channel 5 is used for the key distillation processing and to sending and receiving the state of the LOS communication channel 4.

[Configuration of Optical Transmitter]

Referring to FIG. 3, the configuration of the optical transmitter 20 is described.

As shown in FIG. 3, the optical transmitter 20 is equipped with a laser source 200, a physical random number generator 201, a phase modulator 202, an optical intensity adjuster 203, and a transmitting optics 204.

The laser light source 200 is a laser light source that generates an optical pulse train.

The physical random number generator 201 generates a random bit sequence.

The phase modulator 202 phase-modulates the optical pulse train generated by the laser source 200 on the basis on the random bit sequence generated by the physical random number generator 201.

The optical intensity adjuster 203 adjusts the intensity of the optical pulse train modulated by the phase modulator 202 at an appropriate level. In this embodiment, the optical intensity adjuster 203 adjusts the intensity of the optical pulse train based on the tapping rate ne estimated by the communication channel state estimator 324 described below. Here, the optical intensity adjuster 203 is set to weaken the intensity of the optical signal when the tapping rate ne is large (i.e., when the intensity of the leakage light is large). On the other hand, when the tapping ratio ne is small (i.e., when the intensity of the leakage light is small), the optical intensity adjuster 203 is set to strengthen the intensity of the optical signal.

The transmitting optics 204 is an optics that transmits a light pulse train (light signals 40) whose intensity is adjusted by the optical intensity adjuster 203 through the LOS communication channel 4. For example, the transmitting optics 204 includes a transmitting telescope for focusing light, a coarse tracking system that changes an attitude of the transmitting telescope to follow a relative position change between the sender system 2 and the legitimate receiver system 3, and a fine tracking system for correcting minute changes in the beam position caused by atmospheric fluctuation 42 and other factors.

The operation of the optical transmitter 20 is described below.

An optical pulse train having a length ($N_{tot}+1$) outputted from the laser source 200 is inputted to the phase modulator 202. This optical pulse train is phase-modulated (for any index i, 0 if $x_i=0$ and $\pi$ if $x_i=1$) based on a transmission sequence ($x_0$, $x_1$, . . . , $x_{Ntot}$) outputted from the physical random number generator 201. Here, $N_{tot}$ represents a total number of transmitted optical pulses.

The phase-modulated optical pulse train is inputted to the optical intensity adjuster 203 and adjusted in its intensity (light attenuation) until the intensity reaches an average number of photons NA. Here, the average number of photons MA is set to maximize a key generation speed on the basis of the tapping rate ne inputted from the communication channel state estimator 324. The light reduced optical pulse train is inputted to the transmitting optics 204 and then to the LOS communication channel 4.

Furthermore, a differential exclusive-OR process is applied to the transmission sequence to calculate the exclusive-OR of a certain bit $x_i$i with the previous bit $x_{i-1}$ to generate a raw key sequence ($a_1$, . . . , $a_{Ntot}$). This raw key sequence ($a_1$, . . . , $a_{Ntot}$) is inputted to the key distillator 21.

[Configuration of Optical Receiver]

Referring to FIG. 4, a configuration of the optical receiver 30 is described.

As shown in FIG. 4, the optical receiver 30 is equipped with a receiving optics 300, a 1-bit delay interferometer 301, and a photon detector 302.

The receiving optics 300 is an optics that receives the optical pulse train (optical signals 40) from the optical transmitter 20 via the LOS communication channel 4. For example, the receiving optics 300 includes a receiving telescope for receiving light, a coarse tracking system that changes an attitude of the receiving telescope to follow a relative position change between the sender system 2 and the legitimate receiver system 3, and a fine tracking system for correcting minute changes in a beam position caused by the atmospheric fluctuations 42 and other factors.

The 1-bit delay interferometer 301 causes interference between the optical pulse train received by the receiving optics 300 and its 1 bit delayed pulse train.

The photon detector 302 is an on-off photon detector and includes two photon detectors 302-0 and 302-1. The photon detector 302-0 may be described as D0 and the photon detector 302-1 as D1.

The operation of the optical receiver 30 is described below.

The optical pulse train received by the receiving optics 300 is inputted to the 1-bit delay interferometer 301 for demodulation using a differential phase shift keying scheme. The optical pulse outputted from the 1-bit delay interferometer 301 is inputted to any one of two photon detectors 302-0, 302-1, depending on the outputted port. Specifically, an optical pulse with a relative phase of 0 with respect to the one previous optical pulse is inputted to the photon detector 302-0, and an optical pulse with the relative phase of π is inputted to the photon detector 302-1.

Then, in each time slot, the raw key sequence ($b_1, \ldots, b_{Ntot}$) is generated by chronologically aligning outputs of the photon detectors 302 that have been turned on. This raw key sequence ($b_1, \ldots, b_{Ntot}$) is inputted to the key distillator 31.

Table 1 shows a rule for determining the raw key sequence ($b_1, \ldots, b_{Ntot}$). As shown in Table 1, $b_i=0$ is set when only the photon detector 302-0 is in the on state, and $b_i=1$ is set when only the photon detector 302-1 is in the on state. If both the photon detectors 302-0 and 302-1 are in the on state, $b_i=0$ or $b_i=1$ is randomly determined. If both photon detectors 302-0 and 302-1 are in the off state, a symbol indicating a detection failure is set ($b_i=x$), which assumes the photon has been dissipated.

TABLE 1

|  | D0 is ON | D0 is OFF |
| --- | --- | --- |
| D1 is ON | $b_i = 0$ or $b_i = 1$ | $b_i = 1$ |
| D1 is OFF | $b_i = 0$ | $b_i = x$ |

[Key Distillation Processing]

Figure 5:
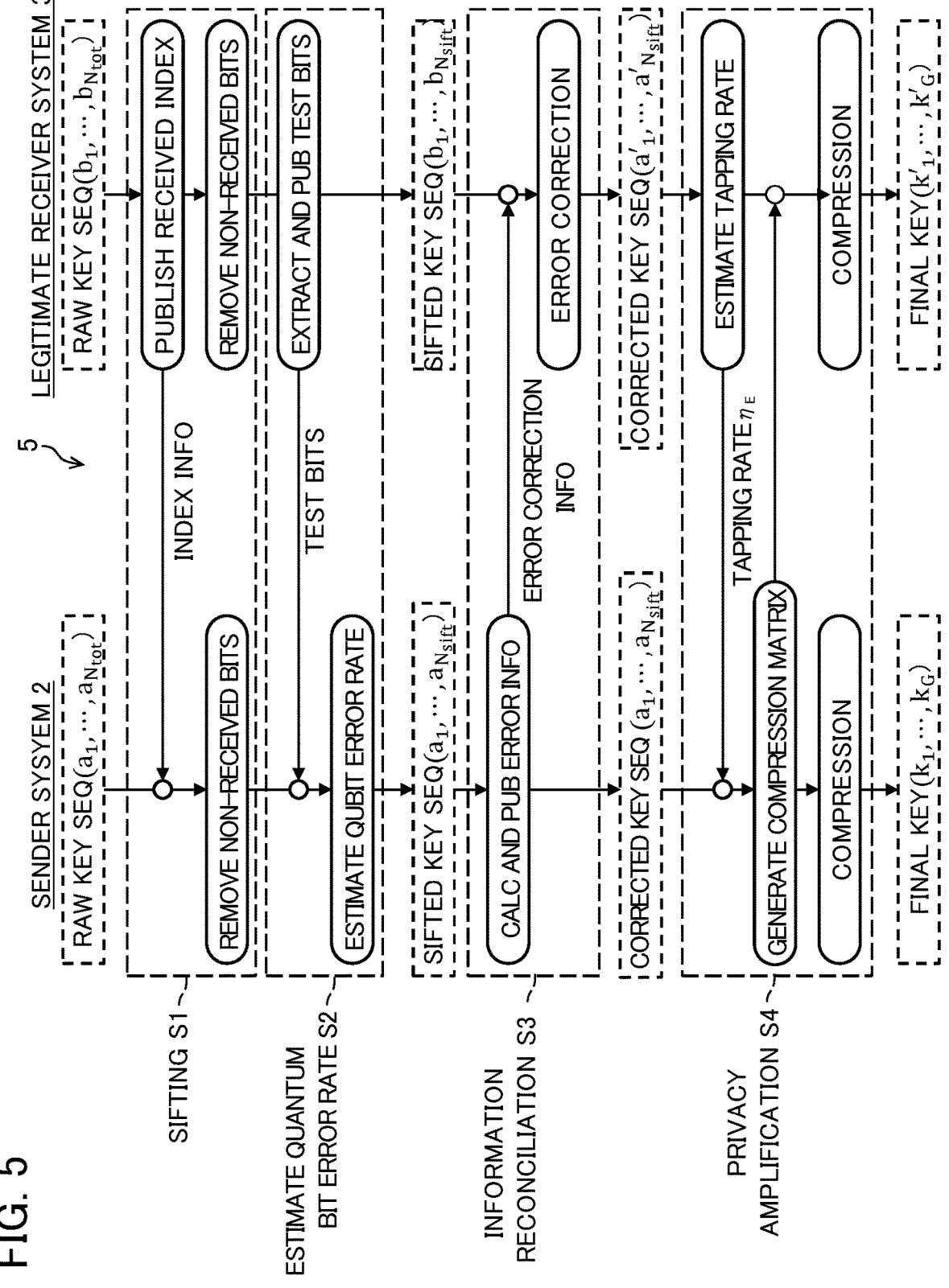
FIG. 5 is a sequence diagram showing a key distillation processing in the embodiment.

Referring to FIG. 5, the key distillation processing performed by the key distillators 21 and 31 is described.

As shown in FIG. 5, the key distillation processing is performed via the authenticated public communication channel 5 and includes four processes: sifting S1, quantum bit error rate estimation S2, information reconciliation S3, and privacy amplification S4.

<Shifting>

In the sifting S1, the key distillator 31 of the legitimate receiver system 3 publishes index information of the successful photon reception to the sender system 2. This index information represents the index i such that $b_i \neq x$.

The key distillator 21 of the sender system 2 constructs a bit sequence that has undergone the sifting, i.e., a sifted key sequence, by extracting from the raw key sequence ($a_1, \ldots, a_{Ntot}$) of the sender system 2 the bits corresponding to the index information published by the key distillator 21 and arranging them in chronological order. In other words, the key distillator 21 removes the bits that are not be able to be received by the legitimate receiver system 3 from the raw key sequence ($a_1, \ldots, a_{Ntot}$).

The key distillator 31, like the key distillator 21, constructs a sifted key sequence from the raw key sequence ($b_1, \ldots, b_{Ntot}$) of the legitimate receiver system 3.

<Quantum Bit Error Rate Estimation>

In the quantum bit error rate estimation S2, the key distillator 31 of the legitimate receiver system 3 performs Bernoulli sampling with a probability $p_{test}$ on each bit of the sifted key sequence. Then, based on the sampling result, the key distillator 31 extracts the bit sequence to construct a test bit sequence of a length $N_{test}$ for the legitimate receiver system 3. Furthermore, the key distillator 31 publishes the test bit sequence and the index information in the sifted key sequence to the sender system 2.

The key distillator 21 of the sender system 2 constructs a test bit sequence of the sender system 2 by extracting bits from the sifted key sequence of the sender system 2 on the basis of the index information published by the legitimate receiver system 3. The key distillator 21 then compares the test bit sequence of the sender system 2 to that of the legitimate receiver system 3 to estimate the quantum bit error rate. The length of the sifted key sequence after extracting the test bit sequence is designated by $N_{sift}$. In addition, the sifted key sequence of the sender system 2 is ($a_1, \ldots, a_{Nsift}$), and the sifted key sequence of the legitimate receiver system 3 is ($b_1, \ldots, b_{Nsift}$).

<Information Reconciliation>

In the information reconciliation S3, the key distillator 21 of the sender system 2 calculates error correction information required for error correction based on the estimated quantum bit error rate. The length of this error correction information is indicated by NIR. Then, the key distillator 21 encrypts this error correction information using the key already shared only once, i.e., with a one-time pad, and then publishes it to the legitimate receiver system 3. Note that the corrected key sequence ($a_1, \ldots, a_{Nsift}$) of the sender system 2 is identical to the sifted key sequence.

The key distillator 31 of the legitimate receiver system 3 uses the error correction information published by the sender system 2 to construct a corrected key sequence ($a'_1, \ldots, a'^{Nsift}$), which matches the sifted key sequence of the sender system 2 with very high probability, from the sifted key sequence of the legitimate receiver system 3.

<Privacy Amplification>

In the privacy amplification S4, the communication channel state estimator 324 of the legitimate receiver system 3 estimates the tapping rate ne based on the measured atmospheric fluctuation of the LOS communication channel 4. Then, the communication channel state estimator 324 publishes the estimated tapping rate $\eta_E$ to the sender system 2. The details of the estimation method of the tapping rate $\eta_E$ is described below.

As described below, the key distillator 21 of the sender system 2 adjusts a compression ratio used when generating the cryptographic key from the random bit sequence of the optical transmitter 20 based on the tapping ratio ne published by the legitimate receiver system 3. Similarly, the key distillator 31 of the legitimate receiver system 3 adjusts a compression ratio used when generating the cryptographic key from the random bit sequence of the optical receiver 30 based on the tapping ratio ne. Note that the compression ratio of the cryptographic key is a ratio of the sequence sizes when the final key sequence is generated from the corrected key sequence in the privacy amplification S4.

Figure 6:
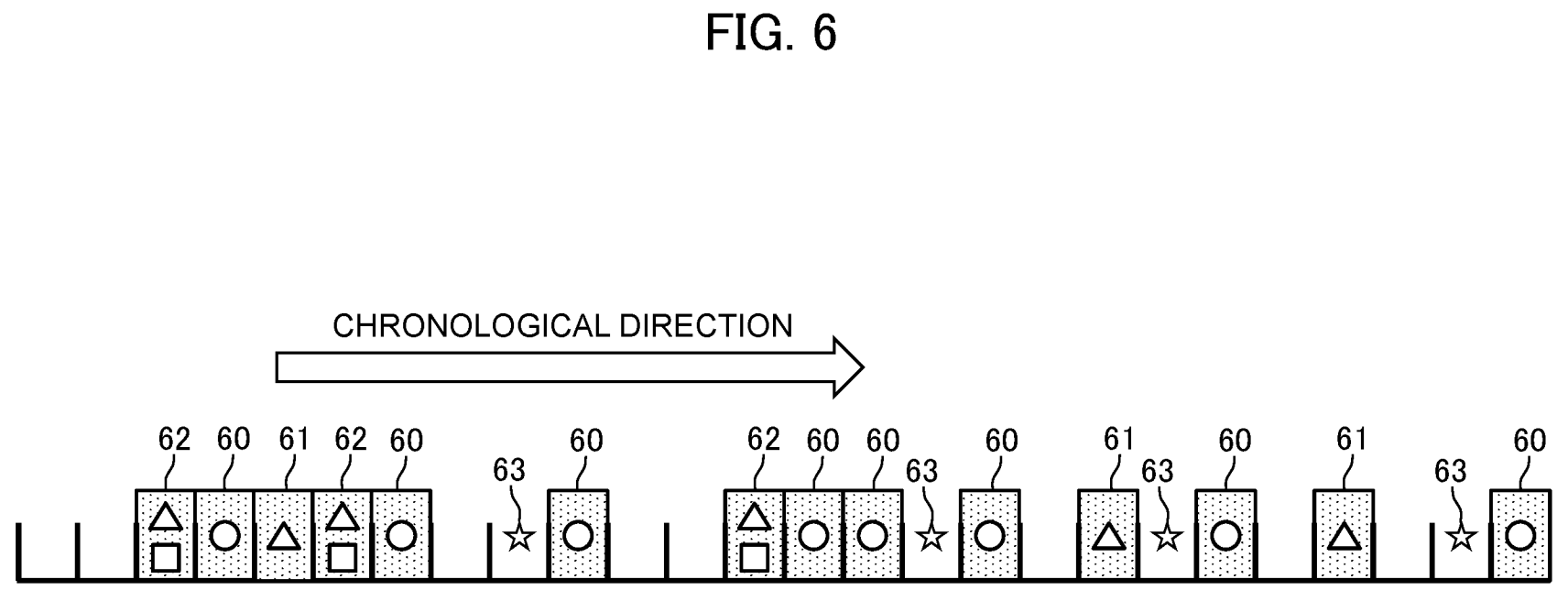

Description is given of the adjustment of the compression ratio of the cryptographic key with reference to FIG. 6.

In this FIG. 6, the slots 60-62 that are illustrated with dots represent the slots (raw key sequences) that have been successfully received by the legitimate receiver system 3. The slot 60 marked with a circle represents the $N_{sift}$ sifted key sequence. The slots 61 marked with a triangle represent the $N_{test}$ test bit sequences. In addition, the slots 62 marked with both triangles and squares represent the test bits ($N_{sif-tes}$ bits) located immediately before the sifted key. Further, the slots 63 marked with a star represent the slots that have failed to be received ($N_{cand}$ bits), which is located immediately before the sifted key.

The key distillator 31 of the legitimate receiver system 3 publishes to the sender system 2 the number $N_{test}$ of the test bit sequence, the number $N_{sif-tes}$ of the test bits (slot 62) that are located immediately before the sifted key, and the number $N_{cand}$ of bits (slot 63) that failed to be received but its immediately subsequent slot is adopted as the sifted key sequence.

The key distillator 21 of the sender system 2 calculates the secret key length $N_{fin}$ using the following equations and the information $N_{test}$, $N_{sif\text{-}tes}$, and $N_{cand}$ received from the legitimate receiver system 3. Then, the key distillator 21 generates a two-dimensional compression matrix having a size of $N_{sift} \times N_{fin}$ and sends it to the legitimate receiver system 3. Furthermore, the key distillator 21 generates the final key $(k_1, \ldots, k_G)$ by multiplying the compression matrix and the corrected key sequence $(a_1, \ldots, a_{Nsift})$. Similarly, the key distillator 31 of the legitimate receiver system 3 generates the final key $(k'_1, \ldots, k'_G)$ by multiplying the compression matrix and the corrected key sequence $(a'_1, \ldots, a'N_{sift})$.

The length G of the final key generated by the above key distillation processing is expressed by the following equation (5). In the right-hand side of this equation (5), the length of error correction information $N_{IR}$, is determined depending on the error correction technique employed in the information reconciliation S3. The final key length $N_{fin}$ is expressed by the following equation (6).

[Math. 5]

$$G = N_{fin} - N_{IR}. \qquad (5)$$

[Math. 6]

$$N_{fin} = \left\lfloor N_{rec}^L \left[ 1 - h_2 \left( \frac{k_{ph}}{N_{rec}^L} \right) \right] - s \right\rfloor. \qquad (6)$$

Here, the function $h_2(p)$ is called a binary entropy function and defined by the following equation (7). Further, kph is a positive integer less than or equal to $N_{rec}^L$ that satisfies any of the following equations (8) and (9). Furthermore, the function $D_{KL}(p\|q)$ is called Kullback-Leibler information and defined by the following equation (10). For arbitrarily given parameters $\varepsilon$ and s, this protocol is $\{2(\varepsilon-2^{-s})\}^{1/2}$-secure.

[Math. 7]

$$h_2(p) = -p \log_2 p - (1-p) \log_2 (1-p) \qquad (7)$$

$$k_{ph} \le N_{rec}^L p_{ph}(\eta_E \mu_A) \qquad (8)$$

$$\varepsilon < 2^{-N_{rec}^L D_{KL}(k_{ph}/N_{rec}^L \| p_{ph}(\eta_E \mu_A))} \qquad (9)$$

$$D_{KL}(p\|q) = p \log_2 \frac{p}{q} + (1-p) \log_2 \frac{1-p}{1-q}. \qquad (10)$$

$p_{ph}(\mu)$ is related to an amount of information leaked to the eavesdropper E, called the phase error rate, and expressed by the following equation (11).

[Math. 8]

$$p_{ph}(\mu) = \frac{1 - \exp(-2\mu)}{2}. \qquad (11)$$

$N_{rec}^L$ is a length of a bit sequence excluding bits related to the test bit sequence published in the quantum bit error rate estimation S2, and expressed by the following equation (12). where $k_{test}$ is a positive integer less than or equal to $N_{cand}$ and satisfies any of the following equations (13) and (14). Note that $N_{cand}$ and $p_{test}$ are defined as described above.

[Math. 9]

$$N_{rec}^L = N_{sift} - N_{sif\text{-}tes} - k_{test} \qquad (12)$$

$$k_{test} \le N_{cand} p_{test} \qquad (13)$$

$$\varepsilon < 2^{-N_{cand} D_{KL}(k_{test}/N_{cand} \| p_{test})}. \qquad (14)$$

[Configuration of Communication Channel State Monitoring Unit]

Figure 7:
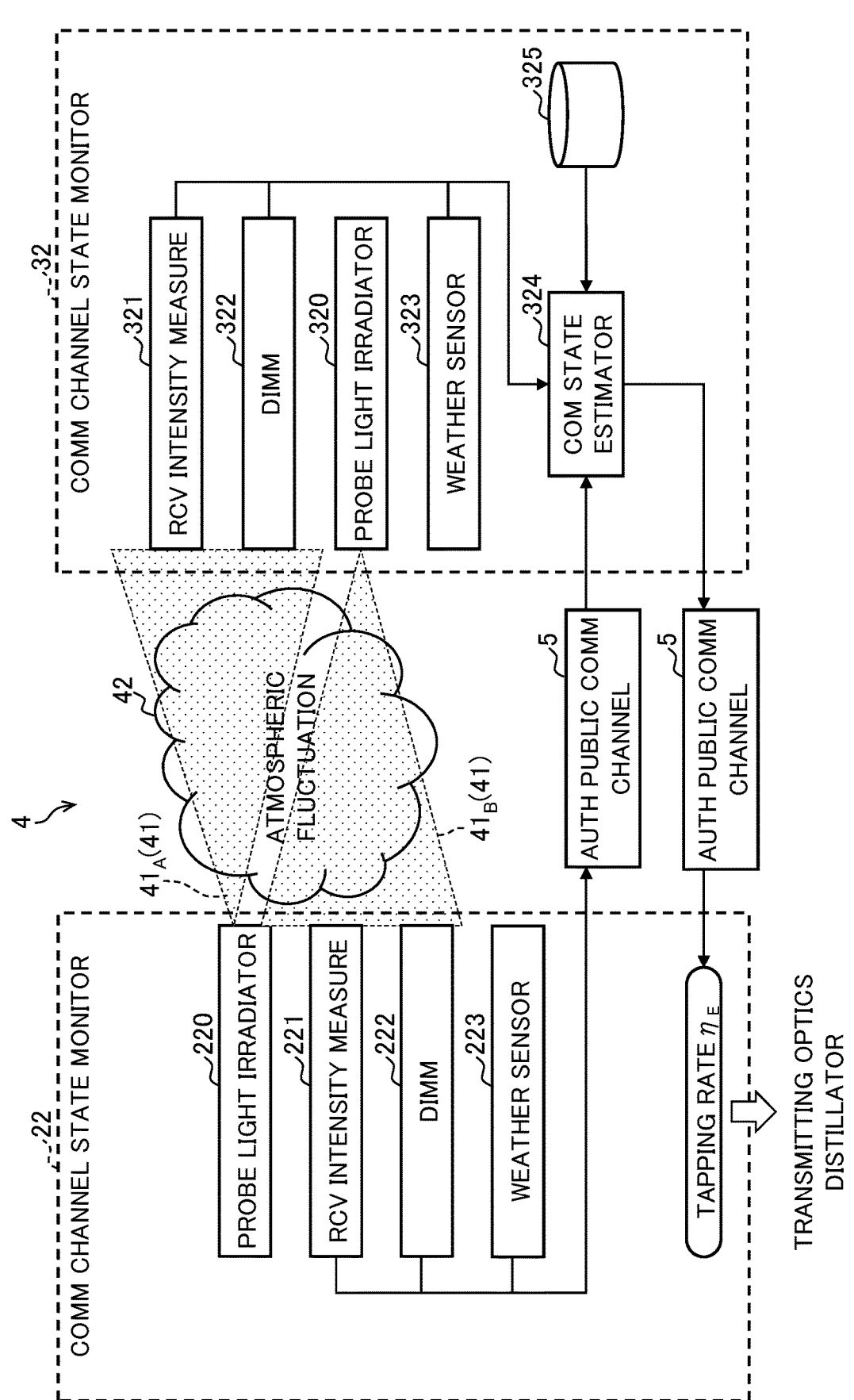
FIG. 7 is a block diagram showing a configuration of a communication channel state monitor in the implementation.

Referring to FIG. 7, description is given of a configuration of the communication channel state monitors 22 and 32. FIG. 7 is an extract of the configuration related to the communication channel state monitors 22 and 32 from the cryptographic key sharing system 1 shown in FIG. 2.

As shown in FIG. 7, the communication channel state monitor 22 of the sender system 2 is equipped with a probe light irradiation section 220, a reception intensity measurement section 221, a DIMM section 222, and a weather sensor 223.

The communication channel state monitor 32 of the legitimate receiver system 3 is equipped with a probe light irradiation section 320, a reception strength measurement section 321, a DIMM section 322, a weather sensor 323, a communication channel state estimator 324, and a memory section 325. Note that the description of the communication channel state monitor 32 is focused on points where it differs from the communication channel state monitor 22.

The probe light irradiation sections 220 and 320 are laser beam light sources that irradiate probe light 41 through the LOS communication channel 4. In this embodiment, the probe light irradiation section 220 of the sender system 2 irradiates the probe light $41_A$ toward the legitimate receiver system 3 from a position that is coaxial with or very close to the transmitting optics 204. The probe light irradiation section 320 of the legitimate receiver system 3 irradiates probe light $41_B$ toward the sender system 2 from a position that is coaxial with or very close to the receiving optics 300. Here, it is preferable that the probe light irradiating sections 220 and 320 should have different wavelengths and polarization directions of the probe light 41 from those of the optical signal 40 to prevent interference between the optical signal 40 and the probe light 41.

The reception intensity measurement sections 221 and 321 receive the probe light 41 through the LOS communication channel 4 and measure a scintillation index and beam acquisition error from the probe light 41 as the state of the LOS communication channel 4 (atmospheric fluctuation 42). In this embodiment, the reception intensity measurement section 221 of the sender system 2 measures the scintillation index and the beam acquisition error from the probe light $41_B$ irradiated by the probe light irradiation section 320 of the legitimate receiver system 3. The reception intensity measurement section 321 of the legitimate receiver system 3 also measures the scintillation index and beam acquisition error from the probe light $41_A$ irradiated by the probe light irradiation section 220 of the sender system 2.

The DIMM sections 222 and 322 measure Fried parameters related to the refractive index of the atmosphere in the LOS communication channel 4 as the state of the LOS communication channel 4 (atmospheric fluctuation 42). Note that DIMM is an abbreviation for Differential Image Motion Monitor. The DIMM sections 222 and 322 measure a relative center-of-gravity fluctuation of an image formed on a camera sensor by the probe light 41 passing through the apertures at distant locations. In this embodiment, the DIMM section 222 measures the Fried parameters on the sender system 2, and the DIMM section 322 measures the Fried parameters on the legitimate receiver system 3.

The weather sensors 223 and 323 measure wind velocity, humidity, air temperature, and atmospheric pressure of the atmosphere as the state of the LOS communication channel. The weather sensor 223 measures the weather parameters on the sender system 2, and the weather sensor 323 measures the weather parameters on the legitimate receiver system 3.

The communication channel state monitor 22 of the sender system 2 transmits the sender's state of the LOS communication channel to the communication channel state estimator 324 of the legitimate receiver system 3 via the authenticated public communication channel 5.

The communication channel state estimator 324 estimates the intensity of leakage light (tapping rate $\eta_E$) leaking outside the LOS communication channel 4 based on atmospheric fluctuations measured by the communication channel state monitors 22 and 32 (Note that this is not limited to cases where the transmitting side is in the space, such as a satellite). Here, the communication channel state estimator 324 may refer to the historical data in the storage unit 325 when estimating the tapping rate $\eta_E$.

The storage unit 325 is a memory, HDD (Hard Disk Drive), or other storage device that stores historical data on the state of LOS communication channel 4.

An example of an estimation method for tapping $\eta_E$ is described below.

If the atmosphere is sufficiently stable (e.g., if the scintillation index is less than $10^{-2}$), the contribution of light leakage to the outside of the LOS communication channel 4 is small and the accuracy of the equipment used to monitor the LOS communication channel 4 is high, so the possibility of eavesdropping on the LOS communication channel 4 is low. In such a case, the communication channel state estimator 324 estimates the tapping rate $\eta_E$ with a low set value (e.g., $10^{-6}$).

If the atmosphere is unstable (e.g., if the scintillation index is greater than $10^{-1}$), the contribution of photons leaking outside of the LOS communication channel 4 is large and the accuracy of the equipment used to monitor the LOS communication channel 4 is low, so the possibility of eavesdropping on the LOS communication channel 4 is high. Furthermore, the worst-case scenario is possible in which all photons leaking outside of the LOS communication channel 4 are eavesdropped. In such a case, the communication channel state estimator 324 estimates the tapping rate ne with a high setting value (e.g., 1–(loss rate between the sender and legitimate receiver)).

In this system, the scintillation index is measured by both the sender system 2 and the legitimate receiver system 3. Therefore, for the sender system 2 side of the LOS communication channel 4, the scintillation index measured by the sender system 2 may be applied, and for the legitimate receiver system 3 side of the LOS communication channel 4, the scintillation index measured by the legitimate receiver system 3 may be applied. In addition, a statistic value (e.g., an average value) may be obtained from the scintillation indexes of the sender system 2 and the legitimate receiver system 3, and may be used.

Indicators other than the scintillation index (e.g., beam acquisition error, Fried parameters, atmospheric wind velocity, etc.) may also be used in estimating the tapping rate $\eta_E$.

Effects

As described above, the cryptographic key sharing system 1 of the embodiment can improve the key generation speed and transmission distance because it can apply differential phase shift keying quantum key distribution to the LOS communication channel 4 and set the strength of the optical signal to an appropriate value. Furthermore, the cryptographic key sharing system 1 can generate cryptographic keys that satisfy universal composability without any restrictions on eavesdropping within the assumed range of the LOS communication channel 4, so that information-theoretically secure cryptographic keys can be shared even when the eavesdropper's capabilities have improved.

In other words, by applying a quantum key distribution scheme based on differential phase shift keying to the LOS communication channel 4 in free space, the cryptographic key sharing system 1 can efficiently generate secure cryptographic keys even though the physical constraints on optical signals are relaxed. Furthermore, the cryptographic key sharing system 1 can generate secure cryptographic keys and maximize the amount of cryptographic key generation regardless of changes in the state of the LOS communication channel 4 by observing the state of the LOS communication channel 4 and adaptively adjusting the strength of the transmitted optical signal and the compression ratio of the cryptographic key according to the measurement results.

In addition, the cryptographic key sharing system 1 can efficiently share information-theoretically secure cryptographic keys between low-Earth-orbit satellites and ground stations, which cannot be broken even by advanced eavesdropping using quantum technology. Furthermore, the cryptographic key sharing system 1 can realize information-theoretically secure cryptographic key sharing between a high-altitude geostationary orbit satellite and a ground station over a very long distance, which cannot be broken even by advanced eavesdropping using quantum technology. This enables the cryptographic key sharing system 1 to extend the information-theoretically secure information communication network to a global scale.

(Modification)

Although the embodiments have been described in detail as above, the invention is not limited to the aforementioned embodiments, but also includes design changes, etc., to the extent that they do not depart from the gist of the invention.

In the embodiments described above, the optical strength adjuster is described as adjusting the strength of the optical signal based on the tapping rate ne estimated by the communication channel state monitor. For example, an administrator of the cryptographic key sharing system may set the strength of the optical signal in advance.

Example

As an example, description is given of a result of a performance comparison of a conventional physical layer cryptography with the quantum key distribution to demonstrate effectiveness of the cryptographic key sharing system according to the above embodiment.

Figure 8:
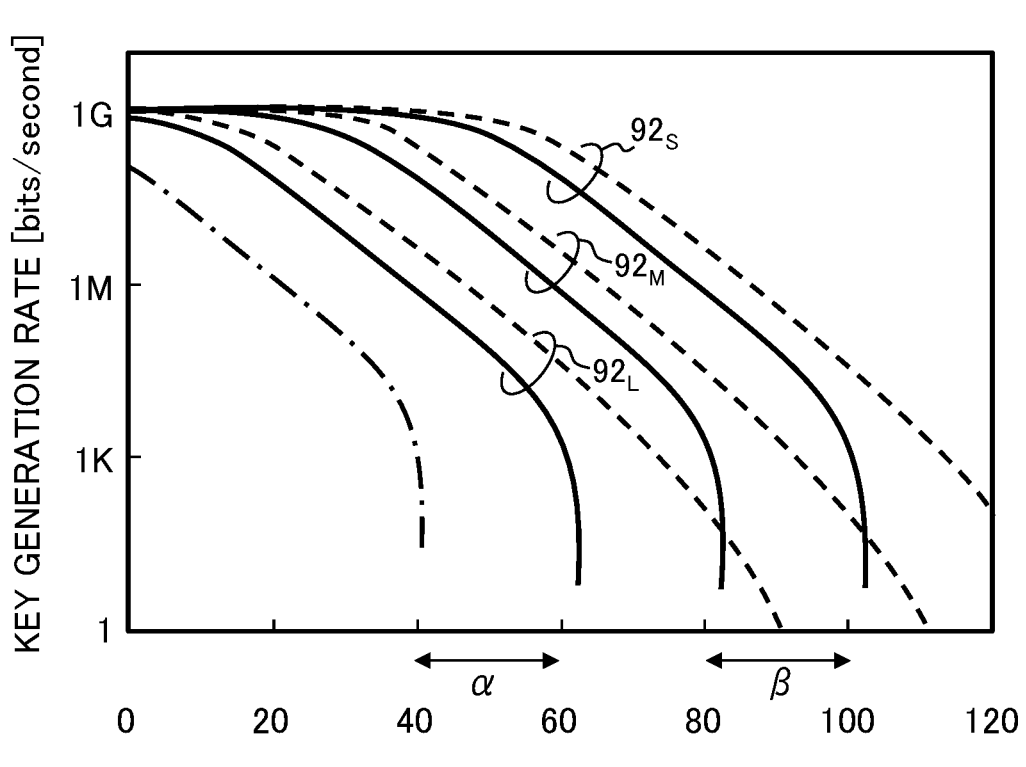
FIG. 8 is a graph showing a key generation rate at asymptotic length in an example of the embodiment.

In general, a performance of each key sharing technique can be evaluated by a key generation rate that is defined as a ratio of a key length G to a total number of transmitted optical pulses $N_{tot}$. In FIG. 8, the key generation rate of the cryptographic key sharing system is illustrated with a solid line, that of the conventional physical layer cryptography with a dashed line, and that of the conventional quantum key distribution with a single dotted line.

In FIG. 8, the key generation rate for each key sharing technique is calculated for a loss between the sender and the legitimate receiver in an ideal environment, called an asymptotic length where the total number of optical pulses, $N_{tot}$, can be set to infinity. Here, a repetition rate of optical pulses is set to 1 GHz, the dark count rate of the detector to 1 KHz, and the efficiency of the error correcting code from the Shannon limit to 1.1. We also assume a linear loss communication channel model in which the LOS communication channel can be modeled by a beam splitter having a transmission ratio of $(1-\eta_B)$. The transmission coefficient between the sender and the legitimate receiver is expressed as $(1-\eta_E)(1-\eta_B)$. Note that $\eta_B$ represents a loss of the LOS communication channel.

The modulation scheme and communication channel model for the physical layer cryptography are assumed to be the same as those for the cryptographic key sharing system. The key generation rates of the cryptographic key sharing system and the physical layer cryptography are compared for large (reference sign: $92_L$), medium (reference sign: $92_M$), and small (reference sign: $92_S$) and three different tapping rates $\eta_E$. In each case, the average number of photons of the optical pulse $\mu_A$ is numerically optimized.

As shown in FIG. 8, the key generation rate of the conventional quantum key distribution (single-dashed line) is the lowest of the three key sharing techniques and decreases rapidly when the loss between the sender and legitimate receiver exceeds 50 dB. Because this loss value is equivalent to the link budget a of the low-Earth-orbit satellite-to-ground optical communication, communications between satellites beyond the medium earth orbit and ground stations inevitably requires use of the physical layer cryptography for communications between satellites and ground stations beyond medium earth orbit.

The key generation rate (solid line) of the cryptographic key sharing system decreases rapidly as the loss between sender and the legitimate receiver becomes smaller, as in the conventional quantum key distribution. However, as the tapping rate ne of the eavesdropper becomes smaller, the key generation becomes more easily executable even if the loss is larger. In the cryptographic key sharing system, if the tapping rate ne is sufficiently small, keys can be generated even with a loss equivalent to the link budget β of the optical communications between a geostationary orbit satellite and the-ground. Therefore, under circumstances where the tapping rate ne can be estimated with a certain degree of accuracy, the cryptographic key sharing system can achieve a secure communication network on a global scale, which is difficult for the conventional quantum key distribution to achieve.

When compared at an equal tapping rate, the key generation rate of the conventional physical layer cryptography (dashed line) always exceeds that of cryptographic key sharing systems by a certain percentage and does not decrease rapidly even when the loss between the sender and the legitimate receiver increases. Therefore, the physical layer cryptography is more suitable for high-speed or long-distance communication than LOS quantum key distribution. However, if there is concern that an eavesdropper may use an eavesdropping method based on the quantum mechanical techniques, the cryptographic key sharing system based on the LOS quantum key distribution inevitably needs to be used for security reasons.

From a viewpoint of system implementation, it is desirable to achieve performance close to a theoretical limit at the asymptotic length even when the total number of optical pulses $N_{tot}$ is of a finite length. Accordingly, FIG. 9 illustrates the key generation rate of the cryptographic key sharing system in an environment where the total number of optical pulses $N_{tot}$ is set to a finite length.

Figure 9:
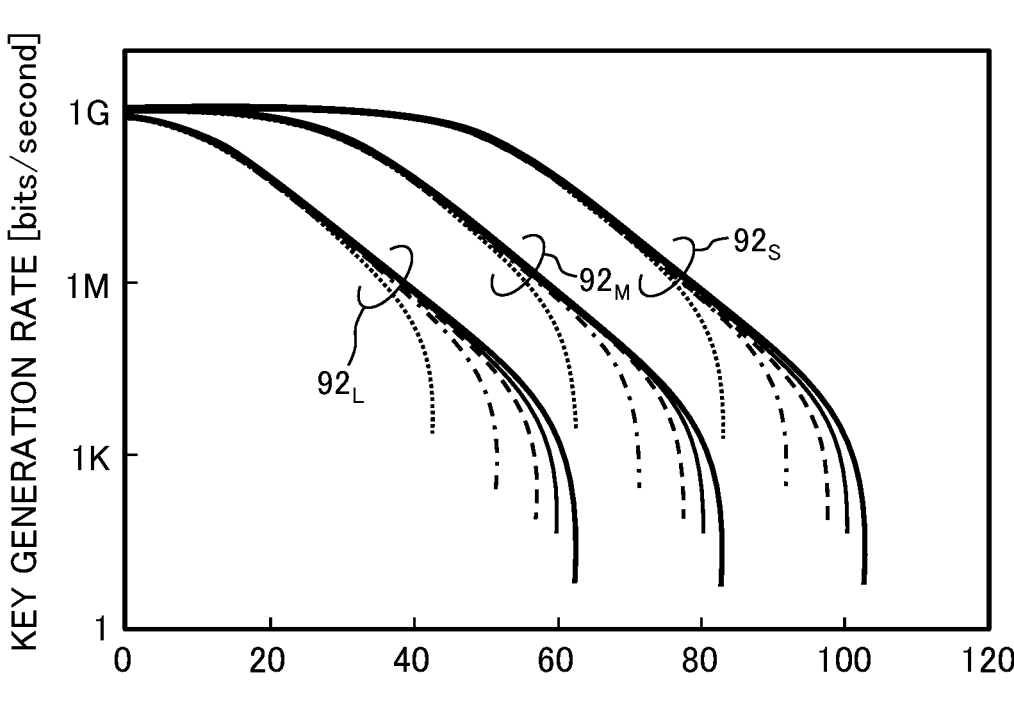
FIG. 9 is a graph showing a key generation rate at a finite length in the example of the embodiment.

FIG. 9 shows that at each tapping rate (reference signs: $92_L$, $92_M$, $92_S$), the performance is very close to that of the asymptotic length when the total number of optical pulses, $N_{tot}$, is $10^9$. When the transmission rate is 1 GHz, this value of the total number of optical pulses $N_{tot}$ corresponds to the number in 1 second, which means that a sufficient amount of keys can be accumulated not only in geostationary orbit satellites but also in a limited communication time window of optical communications between low-Earth-orbit satellites orbiting the earth at relatively high speed and the ground. A burden on a computer in the key distillation processing must also be taken into account, but considering the dissipation of photons in the communication channel, only a sufficient amount of sifted keys may remain to be processed by the key distillation hardware that is currently at a practical level. Therefore, the system can be constructed using hardware at the current level of technology.

REFERENCE SIGNS LIST

1: Encryption key sharing system
2: Sender system (differential phase shift keying quantum key transmitter)
3: Normal receiver system (differential phase shift keying quantum key receiver)
4: LOS communication channel
5: Authenticated public communication channel
20: Optical transmitter
21: Key distillator (1st key distillator)
22: Communication channel state monitor (1st communication channel state monitor)
30: Optical receiver
31: Key distillator (second key distillator)
32: Communication channel state monitor (2nd communication channel state monitor)
324: Communication channel state estimator

What is claimed is:

1. A cryptographic key sharing system comprising a differential phase shift keying quantum key transmitter and a differential phase shift keying quantum key receiver that share a cryptographic key therebetween using an optical signal propagating through a line-of-sight (LOS) communication channel, wherein the differential phase shift keying quantum key transmitter is equipped with an optical transmitter that encodes random bits into the optical signal using differential phase shift keying and transmits the encoded optical signal at a predetermined strength via the LOS communication channel, and a first key distillator that generates a cryptographic key from a sequence of the random bits outputted by the optical transmitter using key distillation processing via an authenticated public communication channel; and the differential phase shift keying quantum key receiver is equipped with:

an optical receiver that receives the optical signal from the optical transmitter via the LOS communication channel and decodes the received optical signal into the random bits, and a second key distillator that generates a cryptographic key from a sequence of the random bits outputted by the optical receiver using the key distillation processing via the authenticated public communication channel, and wherein the differential phase shift keying quantum key transmitter further includes a first communication channel state monitor that measures atmospheric fluctuations in the LOS communication channel, and the differential phase shift keying quantum key receiver further includes:

a second communication channel state monitor that measures the atmospheric fluctuations in the LOS communication channel; and a communication channel state estimator that estimates an intensity of leakage light leaking outside the LOS communication channel on a basis of the atmospheric fluctuations measured by the first communication channel state monitor and the second communication channel state monitor, and wherein the optical transmitter sets an intensity of the optical signal to be transmitted based on the intensity of the leakage light estimated by the communication channel state estimator, the first key distillator adjusts a compression ratio for generating the cryptographic key from the sequence of the random bits outputted by the optical transmitter based on the intensity of the leaked light, the second key distillator adjusts a compression ratio for generating the cryptographic key from the sequence of the random bits outputted by the optical receiver based on the intensity of the leaked light.

2. The cryptographic key sharing system according to claim 1, wherein the optical transmitter sets the intensity of the optical signal to be transmitted weak when the intensity of the leakage light is large, and strong when the intensity of the leakage light is small.

3. The cryptographic key sharing system according to claim 1, wherein the first key distillator adjusts the compression ratio for generating the cryptographic key from the sequence of the random bits outputted by the optical transmitter to be large when the intensity of the leakage light is large, and adjusts the compression ratio for the cryptographic key to be small when the intensity of the leakage light is small, and the second key distillator adjusts the compression ratio for generating the cryptographic key from the random bit sequence of the receiving optical part to be larger when the intensity of the leaked light is large, and adjusts the compression ratio for the cryptographic key to be smaller when the intensity of the leaked light is small.

4. The cryptographic key sharing system according to claim 2, wherein the first key distillator adjusts the compression ratio for generating the cryptographic key from the sequence of the random bits outputted by the optical transmitter to be large when the intensity of the leakage light is large, and adjusts the compression ratio for the cryptographic key to be small when the intensity of the leakage light is small, and the second key distillator adjusts the compression ratio for generating the cryptographic key from the random bit sequence of the receiving optical part to be larger when the intensity of the leaked light is large, and adjusts the compression ratio for the cryptographic key to be smaller when the intensity of the leaked light is small.

5. The cryptographic key sharing system according to claim 1, wherein the communication channel state estimator estimates as the intensity of the leaked light a tapping rate, which is a ratio at which an eavesdropper is able to tap the optical signal in the LOS communication channel.

* * * * *